United States Patent [19]

Tomita

[11] Patent Number: 4,550,796
[45] Date of Patent: Nov. 5, 1985

[54] MOUNT FOR LOUDSPEAKER ON VEHICLE PANEL

[75] Inventor: Shuichi Tomita, Yamagata, Japan

[73] Assignee: Pioneer Electronic Corporation, Tokyo, Japan

[21] Appl. No.: 683,444

[22] Filed: Dec. 19, 1984

[30] Foreign Application Priority Data

Dec. 20, 1983 [JP] Japan .......................... 58-196072[U]

[51] Int. Cl.$^4$ ............................................. H04R 1/20
[52] U.S. Cl. .................................... 181/141; 181/150; 181/171; 179/146 R; 381/86
[58] Field of Search .................... 181/141, 150, 171; 179/146 R, 146 E; 381/86

[56] References Cited

U.S. PATENT DOCUMENTS 3,716,671  2/1973  Karr .................................. 179/146 E
4,337,380  6/1982  Tezuka et al. .................. 179/146 E
4,439,643  3/1984  Schweizer ....................... 179/146 E Primary Examiner—Benjamin R. Fuller
Attorney, Agent, or Firm—Sughrue, Mion, Zinn, Macpeak, and Seas

[57] ABSTRACT

A mount for a loudspeaker is disclosed with which the loudspeaker can be mounted to a panel of a vehicle or the like readily and in a narrow space. The mount includes a spacer having a central aperture for receiving the loudspeaker to be mounted. Around the inner periphery of the aperture in the spacer are located a plurality of sack-shaped fitting inserting members joined to the spacer through arms having screw holes aligned with respective screw holes in the spacer. To mount the loudspeaker, fittings having screw holes are inserted into the fitting inserting members, and the fitting inserting members are bent back so as to temporarily hold the spacer to a corresponding aperture in the panel and to align the screw holes formed in the spacer and mounting arms with those of the fittings. The loudspeaker is then positioned on the spacer and screws are inserted through mounting holes in the loudspeaker and into the screw holes in the fittings.

4 Claims, 5 Drawing Figures

MOUNT FOR LOUDSPEAKER ON VEHICLE PANEL

BACKGROUND OF THE INVENTION

The present invention relates to a mount for a loudspeaker on a panel of a vehicle, such as a rear deck or door panel.

The loudspeakers of a vehicle stereo system or the like are installed in a narrow space, and therefore must be relatively small in size. Accordingly, it is necessary to provide a mechanism for readily and positively mounting such loudspeakers. Heretofore, in order to mount a loudspeaker on a panel of a vehicle, a hole for mounting the loudspeaker and screw holes for fixing the loudspeaker are formed in the door or rear deck panel of the veicle, U-shaped fittings are inserted in the panel in alignment with the screw holes, and, with the mounting holes of the loudspeaker aligned with the fittings, the loudspeaker is secured to the panel with screws. However, this method is disadvantageous in that the fittings may be attracted by the magnet of the loudspeaker, or while one fitting is tightened with screws, another fitting may be displaced.

SUMMARY OF THE INVENTION

An object of the invention is to eliminate the above-described difficulties.

In accordance with the above and other objects, the invention provides a mount for a loudspeaker on a panel of a vehicle or the like in which fittings are inserted into a plurality of fitting inserting members molded integrally with a spacer, hinges of the fitting inserting members are bent to cause the spacer and the fittings to hold the board therebetween, and the loudspeaker is mounted through the spacer on the panel.

DESCRIPTION OF THE PREFERRED EMBODIMENTS

Figure 1A:
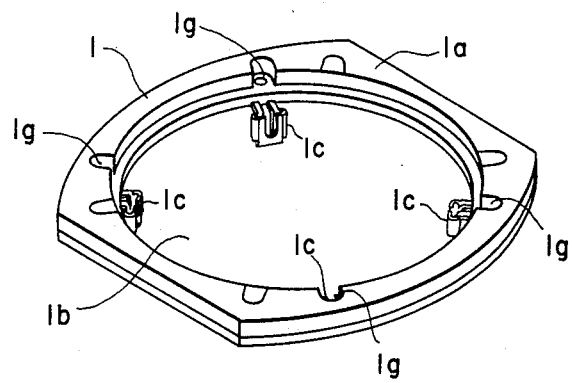
FIGS. 1A and 1B are perspective views showing a spacer and a fitting, respectively.
Figure 2:
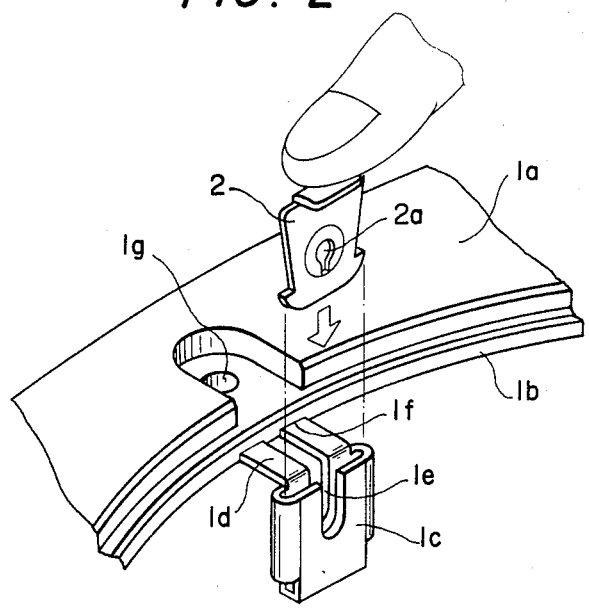
FIG. 2 is a perspective view illustrating a method of connecting the fitting to the spacer.

In the accompanying drawings, reference numeral 1 designates a spacer (FIG. 1A). The spacer is arranged between a panel 3 and a loudspeaker 4 to fixedly secure the loudspeaker 4 to the panel 3. The spacer 1 is a molding of synthetic resin for instance. The spacer 1 includes a body 1a which is brought into contact with the panel 3 and the loudspeaker 4, and a hole 1b into which the loudspeaker 4 is inserted (FIGS. 1A and 2). A plurality of fitting inserting members 1c are provided on the inside of the body 1a by molding (four members 1c being provided in the embodiment shown in the figures).

Figure 1B:
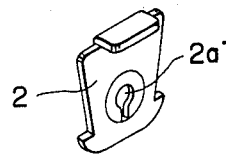

The fitting inserting member 1c is a sack-shaped member which extends at a right angle from the end of an arm 1d which protrudes inwardly from the underside of the spacer body 1a. The fitting inserting member 1c has a groove 1e along the central line to facilitate the insertion of a fitting 2 and which serves as a through-hole for receiving a mounting screw 5. The arm 1d is connected through a hinge 1f to the body 1a. In the figures, 1g designates a hole for a screw (FIG. 1B).

The fitting 2 is inserted into the fitting inserting member 1c. In this operation, the lower protrusions of the fitting 2 are engaged with the lower portion of the fitting inserting member 1c so that the fitting 2 is fixedly held in the fitting inserting member 1c. The fitting 2 has a screw hole 2a for supporting the mounting screw on the underside hole 2a for supporting the mounting screw 5 on the rear side of the panel 3. Examples of the panel 3, as mentioned above, include a door panel or a rear deck panel which are, in general, made of synthetic resin particle board. The panel 3 has a hole 3a into which the loudspeaker 4 is inserted (FIG. 3A), and holes 3b into which the mounting screws 5 are inserted. The loudspeaker 4 has holes 4a has holes 4a into which the mounting screws 5 are inserted.

Figure 3A:
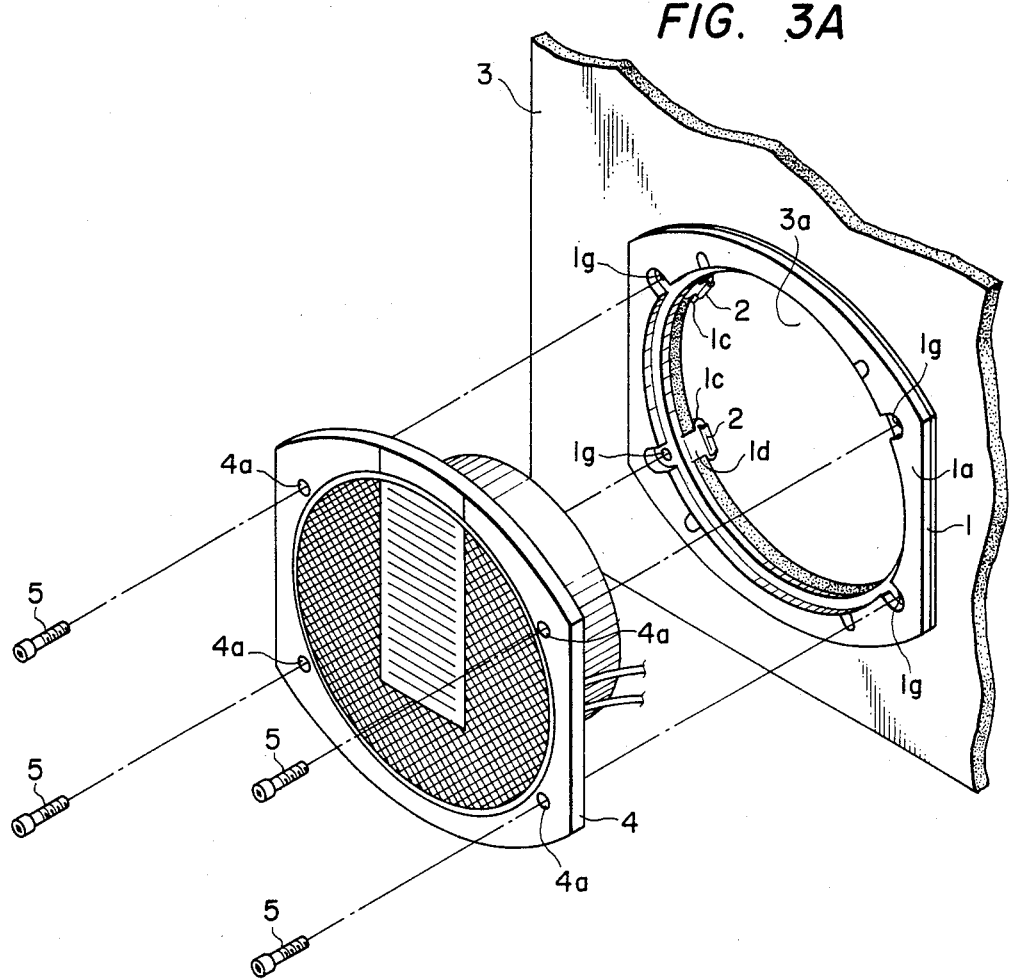
FIG. 3A is a perspective view showing the positional relationships between a loudspeaker, the spacer, a panel and screws.
Figure 3B:
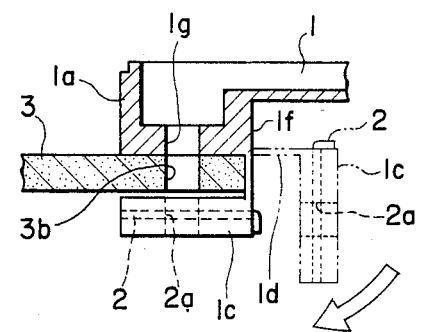
FIG. 3B is a sectional view of these components.

In mounting the loudspeaker 4 at a predetermined position on the vehicle, first the fittings 2 are inserted into the fitting inserting members 1c of the spacer 1 so that the fittings 2 are integral with the spacer 1 as shown in FIG. 2. Then, the spacer 1 is positioned in alignment with the hole 3a as shown in FIG. 3A. Under this condition, the fitting inserting members 1c are set on the rear side of the panel by turning them, as shown in FIG. 3B, so that the panel 3 is held between the spacer 1 and the fitting inserting members 1c. As a result, the spacer 1 is temporarily secured to the panel 3, and the fittings 2 are positioned on the rear side of the panel 3 so that they can be fixed with the screws. Thus, the fittings 2 will not shift from the screw holes 1g of the spacer 1 during the loudspeaker installation operation.

Under this condition, the loudspeaker 4 is placed on the spacer 1 on the panel 3. The mounting screws 5 are inserted into the holes 4a and 1g and then screwed into the screw holes 2a of the fittings 2. Thus, the loudspeaker 4 has been mounted on the panel 3.

The loudspeaker mounting mechanism according to the invention is effective for mounting a loudspeaker not only on a vehicle but also a location such as a ceiling where it is difficult to fix the fittings on the rear side of the loudspeaker.

With the loudspeaker mount of the invention constructed and used as described above, in mounting a loudspeaker on the panel of a vehicle, the fittings will not shift because they are formed integrally with the spacer. Furthermore, as the fittings and the spacer hold the panel therebetween with the aid of the hinges, the fittings can be positioned in place irrespective of the thickness of the panel. Thus, a loudspeaker can be readily and positively mounted on the panel of a vehicle or the like.

I claim:

1. A mount for mounting a loudspeaker on a panel of a vehicle or the like, comprising:
a spacer having an aperture formed therein shaped to receive said loudspeaker;
a plurality of fitting inserting members provided around an inside periphery of said aperture in said spacer, each of said fitting inserting members comprising an arm protruding inwardly from an underside of said spacer, and a sack-shaped fitting inserting member extending from an inward end of said arm said arm having a mounting hole formed therein aligned with a hole in said spacer inwards of said fitting inserting member, and a hinge connecting said arm to said spacer; and a fitting shaped to be received in one of said fitting inserting members, said fittings each having a screw hole for supporting a mounting screw on an underside of a respective one of said holes in said spacer, wherein said loudspeaker is mounted in said panel by placing said spacer over a corresponding aperture in said panel, bending said fitting inserting members so as to hold said spacer to said aperture in said panel and align said screw holes in said fittings with the corresponding holes in said spacer, inserting said loudspeaker into said aperture in said spacer, and screwing screws through screw holes formed in said loudspeaker and into said screw holes in said fittings through said holes in said spacer.

2. The mount for a loudspeaker of claim 1, wherein said fitting inserting members have longitudinally extending holes therein exposing said screw holes in said fittings.

3. The mount for a loudspeaker of claim 1, wherein said spacer is molded of a synthetic resin.

4. The mount for a loudspeaker of claim 1, wherein prior to bending of said fitting inserting members, said fitting inserting members extend substantially perpendicular to a plane of said spacer.

* * * * *